United States Patent [19]

Chiu et al.

[11] 3,898,348

[45] Aug. 5, 1975

[54] FOOD CASING AND METHOD OF PREPARING SAME

[75] Inventors: Herman Shin-Gee Chiu, Chicago; David Voo, Park Forest; John Joseph Standard, Chicago, all of Ill.

[73] Assignee: Union Carbide Corporation, New York, N.Y.

[22] Filed: Nov. 12, 1973

[21] Appl. No.: 415,104

Related U.S. Application Data

[63] Continuation-in-part of Ser. No. 151,924, June 10, 1971, abandoned.

[52] U.S. Cl. ............... 426/413; 426/105; 426/135; 426/415; 426/420; 138/118.1
[51] Int. Cl. ............................................. A22c 13/00
[58] Field of Search ........... 426/105, 135, 140, 198, 426/201, 90, 92, 415, 420, 413; 117/86, 95; 138/118.1, 145

[56] References Cited
UNITED STATES PATENTS

| | | | |
|---|---|---|---|
| 3,451,827 | 6/1969 | Bridgeford | 426/420 |
| 3,558,331 | 1/1971 | Tarika | 426/90 |

*Primary Examiner*—Hyman Lord
*Attorney, Agent, or Firm*—F. Schoenberg

[57] ABSTRACT

Tubular cellulosic food casings having a coating comprising a water-soluble cellulose ether over the internal surface thereof exhibit improved peelability characteristics from food products encased and processed therein.

16 Claims, No Drawings

FOOD CASING AND METHOD OF PREPARING SAME

This application is a continuation-in-part of copending application Ser. No. 151,924 filed June 10, 1971 now abandoned.

The present invention relates to improved food casings and more particularly to cellulosic food casings that are suitable for encasing and processing food products and that may be readily removed from about the processed food product, and to methods of making such casings.

Food casings used in the processed food industry are generally thin-walled tubing of various diameters prepared from regenerated cellulose, cellulose derivatives, alginates, collagen and the like. Fibrous webs may also be embedded in these food casings and such casings are commonly termed in the art "fibrous food casings". In general, these casings have multifunctional uses in that they may be employed as containers during the processing of the food product encased therein and also serve as a protective wrapping for the finished product. In the sausage meat industry, however, the preparation of various types of sausages ranging in size from smaller sausages such as frankfurthers up to the larger sizes such as bolognas usually involves removing the casing from about the processed meat prior to final packaging. Peeling the casing from the processed sausage has presented major problems, particularly in the production of frankfurters where large numbers of the product are involved and the desire in commercial operations is to use high-speed, automatic stuffing and peeling machines.

When the casing is removed from the meat mass, there is occasionally a tendency for some meat to adhere to the casing and be torn from the sausage with the casing, thereby causing surface marring of the sausage. In other instances, variations in the meat emulsion formulations or in the processing conditions can results in a degree of adherence of the casing to the product which hinders rapid removal of the casing from the product encased therein. The use of high-speed, automatic peeling machines in commercial operations as, for example, disclosed in U.S. Pat. Nos. 2,424,346 to Wilcoxon, 2,514,660 to McClure et al., 2,686,927 to Greg, and 2,757,409 to Parkers et al., makes it particularly essential that there be minimal resistance to the separation of casing from sausage, or the product will jam at the peeler or go through unpeeled. Less than complete removal of the casing necessitates the expense of hand sorting and peeling.

Heretofore many attempts have been made to provide casings having easy release characteristics. It is known in the art, as disclosed, for example, in U.S. Pat. Nos. 2,901,358 to Underwood et al., 3,106,471 and 3,158,492 to Firth, 3,307,956 to Chiu et al., 3,442,663 to Turbak, and 3,558,331 to Tarika, that the application of certain types of coatings to the inside wall of food casings may afford improvement in the release characteristics of the casing from the encased sausage product. To the best of our knowledge, however, none of the coatings disclosed in the art is completely satisfactory for use with all types of meat emulsion formulations and commercial processing conditions, particularly when high-speed, automatic commerical peeling equipment is employed. Further, food casings which are generally utilized to obtain food products such as vienna sausage, frankfurters and the like, are typically fabricated in continuous lengths measuring from about 55 feet to 160 feet and longer in length and from about ⅞ inch to 2½ inches or more in flat width which are formed into shirred casing sticks. It has been found that some coatings as, for example, disclosed in U.S. Pat. No. 3,451,827 to Bridgeford, when applied to the inside surface of the food casing, interfers with mechanical shirring of the casing or the mechanical stuffing of shirred casing that has been coated on its internal surface prior to or during the shirring operation.

It is, therefore, an object of the present invention to provide a tubular food casing that is suitable for the encasing and processing of food products and is readily released from the processed food product encased therein.

It is another object of this invention to provide a tubular food casing, and method of producing the same, that is suitable for the processing of sausage products from various types of meat emulsion formulations and is readily released from the sausage processed therein by the use of high-speed, automatic sausage peeling machines.

It is another object of this invention to provide a shirred tubular food casing, and method of producing the same, that is suitable for the processing of sausage products and is readily released from the sausage processed therein by the use of high-speed, automatic sausage peeling machines.

Other objects and advantages of this invention will become apparent from the ensuing discussion thereof.

It has now been found that the objects of the invention may be generally attached by providing a tubular cellulosic food casing having a coating over the internal surface thereof, said coating comprising as an essential ingredient a water-soluble cellulose ether. In a preferred embodiment, the coating comprises a homogeneous admixture of at least two components, one of said components being a water-soluble cellulose ether and a second component being a member selected from the group consisting of animal and vegetable oils, mineral oil, water-soluble alkylene oxide adducts of fatty acid partial esters, and silicone oils, said second component being present in an amount not more than about 0.5 mg/in$^2$ of casing surface and generally in an amount not more than about 15 times the weight of said first component.

Casing produced in accordance with the practice of the present invention can be utilized in the preparation of food products from a wide range of formulations and processing conditions and then can be readily removed from the processed food product using high-speed, automatic peeling machines without scarring or scuffing the surface thereof and with high peeling efficiency.

The food casings of the present invention may be prepared from tubular casings, particularly casings of regenerated cellulose and fibrous reinforced regenerated cellulose that are fabricated in accordance with any of the known commercial methods by applying a coating composition to the internal surface thereof, said coating composition containing a component or components which will be more fully described hereinafter.

An essential component of the coating suitable for use in accordance with the practice of the present invention can be generally designated as water-soluble cellulose ethers. Typical water-soluble cellulose ethers which may be employed are the non-ionic water-soluble alkyl and hydroxylalkyl cellulose ethers such as, for example, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, for example, carboxymethylcellulose and carboxymethyl hydroxyethylcellulose. Commercially, carboxymethylcellulose and carboxymethyl hydroxyethylcellulose are almost always sold as the sodium salt, and it is well established trade practice not to refer to the commercial product as the sodium salt. For the purpose of this application, reference to these materials shall mean the sodium salt and other alkali metal salts thereof. Also suitable are the alkali soluble cellulose ethers, as, for example, alkali soluble methyl cellulose and hydroxyethyl cellulose, and for the purpose of this application the definition of water soluble is intended to include such alkali soluble cellulose ethers.

The amount of water-soluble cellulose ether present on the internal surface of the food casing, which is necessary to impart desired release characteristics, can vary over a wide range though very small quantities are actually required. In general, tubular casings of the present invention will contain at least about 0.001 milligram of cellulose ether per square inch of casing surface (.001 mg/in$^2$), and preferably between about 0.002 mg/in$^2$ and 0.07 mg/in$^2$ of said cellulose ether. Especially preferred are casings having a coating on the internal surface thereof of between about 0.01 mg/in$^2$ and 0.05 mg/in$^2$ of said cellulose ether. Greater amounts of the cellulose ether component my be used, if desired, although generally it will not materially improve the release characteristics of the casing and with certain types of meat formulations or processing conditions, fat separation may be encountered.

One of the most extensive commercial uses for tubular food casings is in the preparation of smaller sausages such as frankfurters, wherein the casing is generally used in the form of shirred casing sticks. Typical methods and apparatus employed in the shirring of lengths of tubular casing to obtain shirred casing sticks are disclosed, for example, in U.S. Pat. Nos. 2,984,574 to Matecki and 3,110,058 to Marbach.

It is well known that the shirred casing stick must be readily extended or deshirred when stuffed with a food emulsion, yet the shirred stick must exhibit sufficient cohesive strength or "coherency" to be self-sustaining and permit handling thereof without breaking, and to insure trouble-free operation with manual and automatic food stuffing apparatus.

It has been found, however, that when certain water-soluble ethers are employed for imparting release characteristics to food casing prepared in the form of shirred casing sticks, the pleats of the shirred casing which are nested together and interlocked, tend to adhere to each other and the casing subsequently will be damaged during stuffing with meat emulsion.

Accordingly, a preferred embodiment of the casing of the present inventionn comprises a food casing having a coating over the internal surface thereof which comprises a homogeneous admixture of at least two components, one of said components being a water-soluble cellulose ether as hereinabove described, and a second component selected from the group consisting of animal and vegetable oils, mineral oil, water-soluble alkylene oxide adducts of fatty acid partial esters and silicone oils. Tubular casings having such a two component coating exhibit excellent release characteristics from food products processed therein, and are especially suitable for preparation into shirred casing sticks since there is generally no tendency for the pleats of the shirred casing sticks to adhere to each other, and the coherency of the shirred casing sticks is suitable for use with automatic stuffing equipment.

The amount of the second component present on the internal surface of the casing in admixture with the cellulose ether component should be at least about 0.1 times the weight of said cellulose ether but not in excess of about 0.5 mg/in$^2$ of casing surface and generally in an amount not more than about 15 times the weight of said cellulose ether component. Preferably, the amount of said second component in the coating will be in a weight ratio to the cellulose ether component of between about 0.5:1 and 5:1 though some members of the group suitable for use as the second component in accordance with the present invention are most advantageously employed in an amount not in excess of about 0.05 mg/in$^2$ of casing surface.

Materials suitable for use in admixture with water-soluble cellulose ethers to prepare the tubular casings of the present invention are refined animal and vegetable oils that are normally liquid at room temperature or have a melting point below about 100°F., food grade mineral oil, silicone oils and preferably the water-soluble alkylene oxide adducts of fatty acid partial esters.

Preferably these materials are water soluble, but materials that are in a dispersible form in aqueous solutions have also been found to be suitable. Typical of this latter type of material would be, for example, an aqueous emulsion of castor oil or mineral oil.

Particularly suitable and preferred are the water-soluble alkylene oxide adducts of partial fatty acid esters as, for example, ethoxylated fatty acid partial esters of such polyols as anhydrosorbitols, glycerol, polyglycerol, pentaerythritol and glucosides. Typical water-soluble adducts of this class are materials commercially available under the trademark "Tween" (Atlas Chemical Industries, Inc.).

Application of the cellulose ether coating to the internal casing surface can be accomplished by using any one of a number of well known methods. Thus, for example, a coating composition containing the water-soluble cellulose ether can be introduced into the casing in the form of a "slug" of liquid, and advancing the casing past the liquid slug coats the inner surface thereof. The casing may be passed through an aqueous solution containing the water-soluble cellulose ether with sufficient residence time provided to permit the coating composition to diffuse through to the internal surface. Alternatively, a preferred method is application of an aqueous coating composition to the internal surface of the casing through a hollow mandrel over which the casing is advancing as, for example, the mandrel of a casing shirring machine in a manner similar to that described in U.S. Pat. No. 3,451,827 to Bridgeford.

It has been found that aqueous solutions of the cellulose ether are most suitable and preferred as a coating composition for preparation of tubular casings of the present invention, affording a more uniform coating of cellulose ether and greater control of the amount of cellulose ether and other components of the desired coating over the surface of the casing. However, application of a coating composition containing the water-soluble cellulose ether in suspension may be satisfactory for preparing casings used for certain applications.

Coating compositions suitable for use in accordance with the practice of the present invention are homogeneous aqueous solutions or suspensions containing at least about 0.05% by weight of water-soluble cellulose ether. The concentration of water-soluble cellulose ether in the coating composition depends primarily on the method of application to be employed and viscosity of the composition. Coating compositions exhibiting viscosity properties up to about 1500 cps at the temperature of application have been found to be satisfactory. However, a viscosity up to about 500 cps is most suitable and preferred.

Suitable coating compositions may also contain other ingredients and preferred embodiments will contain the "second component" hereinabove described in homogeneous admixture with the cellulose ether. The amount of the second component used depends generally on the amount of cellulose ether component in the coating compositions and the amount of cellulose ether that is to be applied to the surface of the casing. As pointed out herein, the amount of the second component in the coating on the surface of the casing should be at least about 0.1 times by weight, and preferably between about 0.5 and 5 times the weight of cellulose ether though not more than about 0.5 mg/in$^2$ of said second component should be present on the surface of the casing. In general, however, when the coating composition is prepared with very small amounts of the cellulose ether, as, for example, about 0.05% to 0.15% by weight, the amount of the second component used in the coating composition will preferably be at least in equal proportions by weight with the cellulose ether.

Particularly suitable coating compositions also contain between about 10% and 90% by weight of polyol having from 3 to 6 carbon atoms and at least 2 hydroxyl groups. Typical polyols that can be employed are glycerol, propylene glycol, triethylene glycol and sorbitol. The amount of polyol that may be used is, in general, dependent on the desired viscosity of the coating composition and also on the amount of water that may be tolerated by the tubular casings being treated, as hereinafter discussed more fully.

A number of factors are known to affect the preparation of shirred casing sticks and the suitability of the shirred casing sticks for use in the processing of various types of food products, particularly when high speed automatic equipment is employed in the shirring and stuffing operations. It is well known in the art, for example, that if the moisture content of the tubular casing is greater than about 20% by weight, difficulty is experienced in formation of proper pleat and shirring patterns, and "bowing and snaking" of the resulting shirred casing stick will occur thereby making stuffing operations more difficult. Further, it has been found that when water is applied to the casing during the shirring process application of excess amounts of water will cause the casing to seize on the shirring mandrel making further processing thereof very difficult, if not impossible.

Accordingly, when it is desired to apply the coating compositions described herein, as, for example, while the tubular casing is passing over a shirring mandrel prior to or during the shirring operation, it has been found that the amount of coating composition applied while treating the internal surface of the casing with a water-soluble cellulose ether must be controlled to limit the amount of water added to the casing. It is also particularly advantageous to avoid application of more coating composition than can be imbibed by the casing in order to prevent excess coating composition from being lost and wasted or from accumulating in localized areas of the shirred sticks with resulting detrimental effects thereto. Generally, not more than about 5 mg/in$^2$ and preferably not more than about 4 mg/in$^2$ of coating composition containing at least about .05% by weight of water-soluble cellulose ether should be applied to the internal surface of the tubular casing. The application of said coating composition must be further controlled so that less than about 3 mg/in$^2$ and preferably less than about 2 mg/in$^2$ of water is applied to the surface of the casing while applying at least about 0.001 mg/in$^2$ and preferably between about 0.002 mg/in$^2$ and 0.07 mg/in$^2$ of cellulose ether to the internal surface thereof.

The amount of water and other ingredients applied to the surface of the tubular casing may, of course, be controlled by varying the amount of coating composition applied and/or the concentration of cellulose ether in the coating composition. It has been found, however, that a particular advantageous means for controlling the amount of water applied to the casing while provided for desired variations of cellulose ether concentrations and viscosity of the coating compositions is afforded by using certain proportions of the polyols hereinabove described in the preparation of such aqueous coating compositions. Homogeneous aqueous cellulose ether coating compositions wherein said polyol is present in a ratio by weight of polyol to water of at least about 0.15 to 1.0 and preferably in a weight ratio that ranges between about 0.4 to 1.0 and 2.5 to 1.0 are particularly suitable for use in the preparation of the tubular cellulosic casings of the present invention.

Another factor known to be especially important in affecting the suitability of shirred casing sticks for use with automatic food stuffing equipment, as, for example employed in the preparation of products such as frankfurters is the durability or coherency of the shirred stick as a self-sustaining article. A disjoinder or break in the shirred stick prior to mounting on the stuffing apparatus makes the stick unsuitable for use. Accordingly, any treatment such as the application of a coating to a tubular food casing that is to be formed into shirred casing sticks must not detrimentally affect the coherency of the shirred stick and the coating material and method of application thereof must be considered in light of its effect on coherency.

Following is a description of the coherency test that is used for determining this important characteristic of shirred casing sticks.

COHERENCY TEST METHOD

Coherency of a casing stick is determined by measuring the bending moment in inch-pounds at the breaking of a stick. A casing stick is cradled on two V-notched support brackets secured on a base plate and spaced apart a distance (D) about 80% to 90% of the length of the casing stick being tested. A pressure member having V-notched struts spaced apart a distance of D less 4 inches is centrally lowered onto the top of the casing stick. A downward pressure is provided by manually operated handle, rack and pinion linkage to a force gauge (such as Hunter Force Indicator, Model L-IM with a "Hold at Maximum Device") that is secured centrally to the pressure member. The force is increasingly applied until the casing stick breaks. The force reading P in pounds is noted. The bending moment in inch pounds at break on the apparatus is equal to P/2 × 2 inches, and thus the force reading P equates to inch-pounds of bending moment to break the casing stick. In general, a coherency of at least about 1.0 inch-pound is required and a coherency of at least about 2.5 inch-pounds is especially suitable and preferred.

The invention will become more clear when considered together with the following examples which are set forth as being merely illustrative of the invention and which are not intended, in any manner, to be limitative thereof. Unless otherwise indicated, all parts and percentages are by weight.

EXAMPLE I

Coating compositions were prepared from several grades of water-soluble carboxymethylcellulose (CMC) using the following proportions of ingredients:

| | |
|---|---|
| Carboxymethylcellulose (CMC) | 1.0% |
| Propylene Glycol | 49.5% |
| Water | 49.5% |

Composition A: The carboxymethlcellulose (CMC) used in this composition was a water-soluble, low viscosity food grade CMC having an average substitution of 7 carboxymethyl groups per 10 anhydroglucose units. It was commercially available as "CMC 7LF" from Hercules, Inc.

Composition B: The CMC employed in this composition was a water-soluble, low viscosity grade having an average degree of substitution of 7 and an upper viscosity limit for a 2% water solution of 18 cps at 25°C. It was commercially available as "CMC 7L1" from Hercules, Inc.

Composition C: The CMC employed in this composition was a water-soluble, low viscosity grade having an average degree of substitution of 7 and an upper viscosity limit of approximately 20 cps at 25°C. It as commercially available as "CMC 7L2" from Hercules, Inc.

Composition D: The CMC employed in this composition was a water-soluble, medium viscosity food grade having an average degree of substitution of 7. It was available commercially as "CMC 7MF" from Hercules, Inc.

Composition E: The CMC employed in this composition was a water-soluble, high viscosity food grade having an average degree of substitution of 7 and was available commercially as "CMC 7HF" from Hercules, Inc. It was necessary to reduce the proportion of CMC in this composition to .25% in order to obtain a solution of workable viscosity.

Commercially produced cellulosic casing samples 84 feet long have a flat width measuring about 1.3 inches were used to prepare the casings of this example. These casings were shirred on an apparatus such as that disclosed in U.S. Pat. No. 3,110,058 to Marbach. As each 84 foot length of casing was being shirred, the particular coating composition was applied in the amount of 3.5 mg of coating composition per square inch of internal surface of casing by metering through the shirring mandrel along with the stream of inflation air.

The following shirred casing samples were prepared using the coating compositions hereinabove described:

Shirred Cassing A: prepared by application of Coating Composition A of this Example, said shirred casing having a uniform coating of 0.035 mg of CMC 7LF per square inch of casing surface.

Shirred Casing B: prepared using Coating Composition B of this Example, said casing having a uniform coating of 0.035 mg of CMC 7L1 per square inch of casing surface.

Shirred Casing C: prepared using Coating Composition C, said casing having a uniform coating of 0.035 mg CMC 7L2 per square inch of casing surface.

Shirred Casing D: prepared using Coating Composition D, said casing having a uniform coating of 0.035 mg CMC 7MF per square inch of casing surface.

Shirred Casing E: prepared using Coating Composition E, said casing having a uniform coating of 0.009 mg CMC 7HF per square inch of casing surface.

Shirred Casing F: control casing prepared by conventional shirring methods.

A frankfurter type meat emulsion prepared from a formulation containing beef and pork trimmings and a high content of collagenous materials was stuffed into the shirred lengths of casing and linked into frankfurters by conventional linking apparatus. It was found that during the stuffing operation of Casings A to E, serious difficulties were encountered apparently due to adherence of the shirred sticks to which the coating compositions of this Example had been applied resulting in excessive casing breakage while the shirred sticks were being stuffed. No difficulty was encountered during the stuffing of Casing F, the standard control casing.

EXAMPLE II

Coating compositions were prepared from several grades of water-solluble carboxymethylcellulose (CMC) using the following proportions of ingredients:

| | |
|---|---|
| Carboxymethylcellulose (CMC) | 0.14% |
| Propylene Glycol | 58.36% |
| Water | 40.0 % |
| Polyoxyethylene sorbitan ester of higher fatty acids | 1.5 % |

Composition A: The carboxymethylcellulose (CMC) used in the preparation of Composition A of Example I was used in this composition.

Composition B: The CMC of Composition B of Example I was used in this composition.

Composition C: The CMC of Composition C of Example I was used in this composition.

Composition D: The CMC of Composition D of Example I was used in this composition.

Composition E: The CMC of Composition E of Example I was used in this composition.

The polyoxyethylene sorbitan ester of higher fatty acids employed in the compositions of this Example was purchased as "Tween 80" from Atlas Chemical Industries, Inc.

Using the cellulosic casing samples, shirring apparatus and coating procedure of Example I, the following shirred casing samples were prepared using coating compositions of this Example II.

Shirred Casing A: prepared by application of Coating Composition A of this Example.

Shirred Casing B: prepared by application of Coating Composition B of this Example.

Shirred Casing C: prepared by application of Coating Composition C.

Shirred Casing D: prepared by application of Coating Composition D.

Shirred Casing E: prepared by application of Coating Composition E.

In each case, a shirred casing was obtained having a uniform coating of a homogeneous admixture of 0.005 mg of the particular grade of CMC and 0.05 mg of fatty acid ester per square inch of casing surface. There was some foaming encountered during the shirring of the casings but in no case did it interfere with the shirring operation.

Shirred Casing F: control casing prepared by using conventional shirring methods.

Using the meat emulsion and casing stuffing and linking procedures described in Example I, Shirred Casings A to F were stuffed and linked into frankfurters. There were no difficulties, such as casing breakage, encountered during the stuffing and linking of any of the casings of this Example. The stuffed casings were all processed in a smokehouse using a processing cycle known to adversely affect the peelability of casing from encased food product. The processing cycle used consisted of a one minute smoke period followed by a 30 minute period during which time the temperature of the smokehouse was increased from 140°F. to 180°F. without attempting to adjust relative humidity. The temperature of the smokehouse was maintained at a temperature of about 180°F. until the internal temperature of encased food product reached about 156°F., after which time the frankfurters were showered in the smokehouse until their internal temperature was between 77°F. and 80°F. The frankfurters were then removed from the smokehouse and cooled to an internal temperature of between 38°F. and 45°F.

Peelability characteristics of the various casings of this Example were evaluated on a peeling machine known commercially as a "Timesaver Peeler" which was adjusted to peel at the rate of 2000 pounds of frankfurters per hour.

The encased food products were sprayed thoroughly with water prior to being passed through the peeling apparatus. Results of the peeling tests are set forth in Table I, below, wherein peelability is reported as weight percent of the food product peeled (i.e., 0% denotes that none of the casing had been peeled from about the food product encased therein, and 100% represents total peeling and release of the casing from the food product).

TABLE 1

| Casing | Peelability (%) |
|---|---|
| A | 95 |
| B | 41 |
| C | 91 |
| D | 88 |
| E | 68 |
| F | 0 |

As can be seen from the results in Table 1, Casings A to E exhibited a substantial improvement in peeling characteristics over that exhibited by control casing F. Further, Casings A to E, prepared with the coating compositions of this Example, exhibited none of the breakage difficulties during stuffing with food product that were noted in Example I.

EXAMPLE III

Using the carboxymethylcellulose used in the preparation of Coating Composition A of Example I, coating compositions having the following proportion of ingredients were prepared:

| | |
|---|---|
| Carboxymethylcellulose ("CMC 7LF") | variable as noted |
| Propylene Glycol | variable as noted |
| Water | 40.0% |
| Polyoxyethylene sorbitan ester of higher fatty acids ("Tween 80") | 1.5% |

Composition A: No CMC was used in this composition. 58.5% Propylene glycol was used.

Composition B: 0.14% CMC and 58.36% propylene glycol were used in the preparation of this coating composition.

Composition C: 0.34% CMC and 58.16% propylene glycol were used in the preparation of this coating composition.

Composition D: 0.72% CMC and 57.78% propylene glycol were used in the preparation of this coating composition.

Composition E: 1.42% CMC and 57.08% propylene glycol were used in the preparation of this coating composition.

Using the commercial cellulosic casing sample, shirring apparatus and coating procedures described in Example I, the following shirred casing samples were prepared with the coating compositions of this Example III.

Shirred Casing A: prepared by application of Coating Composition A above, said shirred casing having a coating of 0.05 mg of fatty acid ester per square inch of internal casing surface.

Shirred Casing B: prepared by application of Coating Composition B above, said shirred casing having a coating of a homogeneous admixture of 0.005 mg CMC and 0.05 mg fatty acid ester per square inch of casing surface.

Shirred Casing C: prepared by application of Coating Composition C above, said casing having a coating of a homogeneous admixture of 0.012 mg CMC and 0.05 mg fatty acid ester per square inch of casing surface.

Shirred Casing D: prepared by application of Coating Composition D above, said casing having a coating of a homogeneous admixture of 0.025 mg CMC and 0.05 mg fatty acid ester per square inch of casing surface.

Shirred Casing E: prepared by application of Coating Composition E above, said casing having a coating of a homogeneous admixture of 0.05 mg CMC and 0.05 mg fatty acid ester per square inch of casing surface.

Shirred Casing F: control casing of Example I.

Using the meat emulsion, stuffing and processing procedures and peeling test procedure described in Example II, the peeling test results set forth in Table 2 below were determined.

TABLE 2

| Casing | Peelability (%) |
|---|---|
| A | 0 |
| B | 38 |
| C | 100 |
| D | 100 |
| E | 100 |
| F | 0 |

As can be seen from the results tabulated above, casings prepared in accordance with the present invention exhibit substantially improved peelability characteristics over those exhibited by the control casing. Further, it can be seen that only the coating compositions in this series of tests which contained the cellulose ether afforded improvement in casing peelability.

EXAMPLE IV

A variety of frankfurther type meat emulsions were prepared and used in this Example. Meat emulsion A was the high collagen formulation described in Example I. Meat emulsion B was a formulation containing collagenous material and dry skim milk powder. Meat emulsion C was an all meat formulation containing a reduced amount of collagenous material. Meat emulsion D was an "all beef" formulation.

Shirred casing sticks shirred and coated as described in Example I were prepared having the following amount of coating.

dures described in Example II, encased processed food products were prepared.

The peelability characteristics of these encased food products were evaluated using the procedure described in Example II and the results of these tests are tabulated in Table 3 below.

TABLE 3

| Casing | Meat Emulsion | Peelability (%) |
|---|---|---|
| A | A | 62 |
| B | A | 100 |
| C | A | 0 |
| A | B | 100 |
| B | B | 100 |
| C | B | 58 |
| A | C | 43 |
| B | C | 100 |
| C | C | 0 |
| A | D | 33 |
| B | D | 100 |
| C | D | 0 |

The results summarized in Table 3, above, clearly show that casings prepared in accordance with the present invention exhibit improved peelability characteristics with a variety of meat emulsion formulations.

EXAMPLE V

The same method and tests as set forth in Examples I and II above were used to evaluate the peelability characteristics of tubular casing treated with the coating compositions described in Table 4 below.

"CMC 7LF" was the carboxymethylcellulose of Composition A, Example I; "CMC 7MF" was the car-

TABLE 4

| INGREDIENTS | COATING COMPOSITION (%) | | | | | | | | | | | |
|---|---|---|---|---|---|---|---|---|---|---|---|---|
| | A | B | C | D | E | F | G | H | I | J | K | L |
| "CMC 7LF" | 0.14 | 0.14 | 1.0 | — | — | — | — | — | — | — | — | — |
| "CMC 7MF" | — | — | — | 0.14 | 0.14 | 1.0 | — | — | — | — | — | — |
| "CMC 4M6" | — | — | — | — | — | — | 0.14 | 1.0 | — | — | — | — |
| "CMC 9M8" | — | — | — | — | — | — | — | — | 0.14 | 1.0 | — | — |
| "CMC 12M8" | — | — | — | — | — | — | — | — | — | — | 0.14 | 1.0 |
| Water | 40.0 | 40.0 | 40.0 | 40.0 | 40.0 | 40.0 | 40.0 | 40.0 | 40.0 | 40.0 | 40.0 | 40.0 |
| Propylene Glycol | 59.72 | 58.36 | 58.0 | 59.72 | 58.36 | 58.0 | 59.72 | 58.0 | 59.72 | 58.0 | 59.72 | 58.0 |
| "Tween 80" | 0.14 | 1.5 | 1.0 | 0.14 | 1.5 | 1.0 | .14 | 1.0 | .14 | 1.0 | .14 | 1.0 |
| Viscosity (cps) | 14 | 17 | 65 | 37 | 35 | 280 | 22 | 1500 | 39 | 396 | 37 | 250 |

Shirred Casing A: the shirred casing coating was an homogeneous admixture of 0.005 mg CMC 7LF and 0.005 mg Tween 80 per square inch of casing surface.

Shirred Casing B: the coating on the internal surface of the shirred casing was an homogeneous admixture of 0.035 mg CMC 7LF and 0.035 mg Tween 80 per square inch of casing surface.

Shirred Casing C: the control casing F defined in Example I.

Using the meat emulsions and shirred casings of this Example, casing stuffing and linking procedures described in Example I and frankfurter processing proceboxymethylcellulose of Composition D, Example I; "CMC 4M6" was carboxymethylcellulose having an average degree of substitution of 4 carboxymethyl groups per 10 anhydroglucose units; "CMC 9M8+ was carboxymethylcellulose having an average degree of substitution of 9 carboxymethyl groups per 10 anhydroglucose units; "CMC 12M8" was carboxymethylcellulose having an average degree of substitution of 12 carboxymethyl groups per 10 anhydroglucose units.

The peelability test results are summarized in Table 5, below, for the various casings prepared using the coating composition of this Example. Meat emulsion C in this Example is the same as meat emulsion C of Example IV and meat emulsion A is the meat emulsion A of Example IV.

TABLE 5

| COATING COMPOSITION | PEELABILITY TESTS AMOUNT OF COATING (mg/in$^2$) | | MEAT EMULSION | % PEELABILITY |
|---|---|---|---|---|
| | CMC | "Tween 80" | | |
| A | .005 | .005 | C | 42 |
| B | .005 | .05 | C | 91 |

TABLE 5 -Continued

| COATING COMPOSITION | PEELABILITY TESTS AMOUNT OF COATING (mg/in$^2$) | | MEAT EMULSION | % PEELABILITY |
|---|---|---|---|---|
| D | .005 | .005 | C | 8 |
| E | .005 | .05 | C | 64 |
| G | .005 | .005 | C | 92 |
| I | .005 | .005 | C | 8 |
| K | .005 | .005 | C | 8 |
| No Coating-Control Casing | — | — | C | 0 |
| C | .035 | .035 | A | 100 |
| F | .035 | .035 | A | 100 |
| H | .035 | .035 | A | 100 |
| J | .035 | .035 | A | 100 |
| L | .035 | .035 | A | 100 |
| No Coating-Control Casing | — | — | A | 0 |

EXAMPLE VI

The same method and tests as set forth in Examples I and II, above, were used to demonstrate the suitability of carboxymethylcellulose admixtures with other components in the preparation of tubular casings having improved peelability characteristics. Summarized in Table 6, below, are the proportions of the various ingredients that were used to prepare the Coating Compositions A through D employed in this Example

TABLE 6

| | COATING COMPOSITIONS | | | |
|---|---|---|---|---|
| Ingredients | A | B | C | D |
| "CMC 7LF" | 1.0% | 1.25% | 1.25% | 1.0% |
| Water | 48.5% | 48.4% | 45.0% | 35.0% |
| Propylene Glycol | 48.5% | 48.4% | 51.8% | 50.0% |
| Other Additives | | | | |
| Castor Oil | 2.0% | 2.0% | | |
| "Tween 40" | | | 2.0% | |
| Glyceryl Mono-oleate | | | | 1.0% |
| Mineral Oil | | | | 13.0% |
| Viscosity cps. | 60 | 75 | 114 | 175 |

"Tween 40" polyoxyethylene (20) sorbitan monopalmitate was purchased commercially from Atlas Chemical Industries, Inc.

To obtain Coating Compositions A and B, an aqueous emulsion of caster oil was prepared using di-octyl sodium sulfosuccinate as an emulsifier, and the castor oil emulsion was then admixed with an aqueous CMC solution. To obtain Coating Composition D, an aqueous emulsion of mineral oil using glyceryl mono-oleate as the emulsifying agent was prepared and then admixed with an aqueous CMC solution.

The peelability test results are tabulated in Table 7, below, for the various casings prepared using the coating compositions of this Example.

TABLE 7

| Casing | Coating Composition | PEELABILITY TESTS Amount of Coating Applied | | Peelability |
|---|---|---|---|---|
| A | A | CMC .03 mg/in$^2$ Castor Oil .06 mg/in$^2$ | { | 96 |
| B | B | CMC .05 mg/in$^2$ Castor Oil .08 mg/in$^2$ | { | 100 |
| C | C | CMC .0375 mg/in$^2$ "Tween 40" .06 mg/in$^2$ | { | 91 |
| D | D | CMC .04 mg/in$^2$ Mineral Oil .52 mg/in$^2$ | { | 100 |
| Control | None | | | 0 |

No casing breakage was experienced during the stuffing of the casings of this Example with food emulsion. Casings A to D exhibited improved peelability characteristics over that exhibited by the control casing.

EXAMPLE VII

The same method and tests as set forth in Examples I and II, above, were used to evaluate the peelability characteristics of tubular casings treated with the coating compositions described in Table 8, below.

TABLE 8

| INGREDIENTS | COATING COMPOSITION (%) | | | |
|---|---|---|---|---|
| | A | B | C | D |
| CMHEC-37L | 0.14 | 1.0 | — | — |
| CMHEC-43L | — | — | 0.14 | 1.0 |
| Water | 40.0 | 40.0 | 40.0 | 40.0 |
| Propylene Glycol | 59.72 | 58.0 | 59.72 | 58.0 |
| "Tween 80" | 0.14 | 1.0 | 0.14 | 1.0 |
| Viscosity cps. | 15 | 44 | 13 | 50 |

"CMHEC-37L" is the sodium salt of carboxymethyl hydroxyethylcellulose having an average degree of substitution of 3 carboxymethyl and 7 hydroxyethyl groups per 10 anhydroglucose units. "CMHEC-43L" is the sodium salt of carboxymethyl hydroxyethylcellulose having an average degree of substitution of 4 carboxymethyl and 3 hydroxyethyl groups per 10 anhydroglucose units. Both materials were commercially available from Hercules, Inc.

No casing breakage was experienced during the stuffing of the coated casings. Peelability test results for casing prepared with the coating compositions of this Example are summarized in Table 9, below.

TABLE 9

| COATING COMPOSITION | PEELABILITY TESTS AMOUNT OF COATING (mg/in$^2$) | | % PEELABILITY |
|---|---|---|---|
| | CMHEC | "Tween 80" | |
| A | .005 | .005 | 68 |
| B | .035 | .035 | 95 |
| C | .005 | .005 | 59 |
| D | .035 | .035 | 91 |
| No Coating-Control Casing | None | None | 0 |

EXAMPLE VIII

Adherence tests were run to illustrate the adherence between plies of cellulose tubular material treated with various cellulose ether containing coating compositions.

A uniform coating of a coating composition was applied over the surface of regenerated cellulosic film taken from a sample tubular casing. Another layer of regenerated cellulose film was placed over the coated cellulosic film and the film sandwich was clamped together between flat plates to insure uniform wetting of both film surfaces and the elimination of air pockets from between the layers of film. The force required to peel one layer of film from the other was determined by retaining an end of one layer of film in a stationary clamp and clamping the adjacent end of overlapping film in a device that exerts a steady, slow force to peel back and separate the layers of film in the sandwich, said device having means for measuring the force required to separate the film plies.

Results of adherence tests and the proportion of ingredients of various coating compositions that were evaluated are summarized in Table 10, below.

surface of the casing. Application of the coating composition through a hollow mandrel over which the tubular cellulosic casing is passing, particularly the shirring mandrel about which the tubular casing is shirred, is a particularly advantageous method of preparing the casings of the present invention. The application of more coating composition than can be imbibed by the casing, however, results in the loss of excess coating composition or non-uniform accumulations in the shirred casing. Further, if the amount of water applied to the casing is excessive, difficulties arise during the shirring of the casing such as, for example, seizing of the shirred casing on the mandrel or excessive limpness of the shirred casing stick.

Coating compositions were prepared having the proportion of ingredients described in Table 11, below.

The methylcellulose used in composition D was "Methocel MC-100" and in compositions E and F was

TABLE 10

| INGREDIENTS | COATING COMPOSITION (%) | | | | | | | |
|---|---|---|---|---|---|---|---|---|
| | A | B | C | D | E | F | G | H |
| "CMC 7LF" | 1.0 | 1.0 | 1.0 | — | — | 1.0 | 1.0 | 1.0 |
| "HEC-WP 40" | — | — | — | 1.0 | 1.0 | — | — | — |
| Propylene Glycol | 59.0 | 58.75 | 58.5 | 59.0 | 58.0 | 58.0 | 57.0 | 55.0 |
| Water | 40.0 | 40.0 | 40.0 | 40.0 | 40.0 | 40.0 | 40.0 | 40.0 |
| "Tween 80" | — | 0.25 | 0.5 | — | 1.0 | — | — | — |
| "L-520 Silicone" | — | — | — | — | — | 1.0 | — | — |
| Silicone Fluid "LE-45" | — | — | — | — | — | — | 2.0 | 4.0 |
| Adherence Force, lbs. per 1.3 inches of film width | .225 | .125 | 0.0 | .12 | .01 | 0.0 | 0.125 | 0.05 |

TABLE 11

| INGREDIENTS | COATING COMPOSITION (%) | | | | | |
|---|---|---|---|---|---|---|
| | A | B | C | D | E | F |
| "CMC 7LF" | 0.2 | 2.0 | 1.0 | — | — | — |
| Methylcellulose | — | — | — | 2.0 | 5.0 | 3.0 |
| Water | 85.8 | 84.0 | 40.0 | 86.3 | 83.6 | 67.0 |
| Glycerine | 12.0 | 12.0 | 57.0 | 11.7 | 11.4 | — |
| Propylene Glycol | — | — | — | — | — | 27.0 |
| "Tween 80" | 2.0 | 2.0 | 2.0 | — | — | 3.0 |
| Ratio Polyol to Water | 0.140 | 0.143 | 1.43 | 0.136 | 0.136 | 0.40 |

The "HEC-WP 40" is a grade of hydroxyethylcellulose available commercially from Union Carbide Corporation, and Tween 80 was described in Example II. The "L-520 Silicone" is a water soluble organosilicone copolymer fluid available commercially from Union Carbide Corporation. "Silicone Fluid LE-45" is an aqueous emulsion containing 45% dimethyl polysiloxane fluid available commercially from Union Carbide Corporation.

The results show the reduced adherence between regenerated cellulose films coated with various cellulose ether materials when the cellulose ether is admixed with a second component as hereinabove discussed. This reduced adherence is apparently quite significant when stuffing shirred tubular cellulosic casings of the present invention.

EXAMPLE IX

This example illustrates the importance of controlling the amount of coating composition and water in the coating composition that is applied to the internal "Methocel MC-10", both of which materials were purchased from Dow Chemical Company.

Using the cellulosic casing, shirring apparatus and coating procedures described in Example I, the following shirred casing samples were prepared with the coating compositions of this Example.

Shirred Casing A: 3.5 mg/in$^2$ of Coating Composition A was used to treat the internal surface of the casing, whereby 3.0 mg/in$^2$ of water, 0.42 mg/in$^2$ of glycerine, and an admixture of 0.007 mg CMC and 0.07 mg of Tween 80 per square inch of casing were applied thereto.

Shirred Casing B: 3.5 mg/in$^2$ of Coating Composition B was used to treat the internal surface of the casing whereby 2.9 mg/in$^2$ of water, 0.42 mg/in$^2$ of glycerine, and an admixture of 0.07 mg CMC and 0.07 mg of Tween 80 per square inch of casing were applied thereto.

Shirred Casing C: 3.5 mg/in$^2$ of Coating Composition C was used to treat the internal surface of the casing whereby 1.4 mg/in$^2$ of water, 2.0 mg/in$^2$ of glycerine, and an admixture of 0.035 mg CMC and 0.07 mg of Tween 80 per square inch of casing was applied thereto.

Shirred Casing D-1: 3.5 mg/in$^2$ of Coating Composition D was used to treat the internal surface of the casing whereby 3.0 mg/in$^2$ of water, 0.41 mg/in$^2$ of glycerine, and 0.07 mg/in$^2$ of Methocel MC-100 were applied thereto.

Shirred Casing D-2: 1.75 mg/in$^2$ of Coating Composition D was used to treat the internal surface of the casing whereby 1.5 mg/in$^2$ of water, 0.20 mg/in$^2$ of glycerine, and 0.035 mg/in$^2$ of Methocel MC-100 were applied thereto.

Shirred Casing E: 1.75 mg/in$^2$ of Coating Composition E was used to treat the internal surface of the casing whereby 1.43 mg/in$^2$ of water, 0.20 mg/in$^2$ of glycerine, and 0.088 mg/in$^2$ of Methocel MC-10 were applied thereto.

Shirred Casing F: 2.2 mg/in$^2$ of Coating Composition F was applied to the internal surface of the casing whereby 1.47 mg/in$^2$ of water, 0.60 mg/in$^2$ of propylene glycol and an admixture of 0.066 mg Methocel MC-10 and 0.066 mg Tween 80 per square inch of casing were applied thereto.

Extreme difficulties were encountered during the preparation of shirred casings A, B and D-1 due to seizing of the shirred casing on the shirring mandrel and the casings could not be used further.

No casing seizure problems were encountered during the preparation of casings C and F wherein lower levels of water were applied to the surface of the casing during application of Coating Compositions C and F. The amount of water applied in the preparation of casings C and F was primarily controlled by increasing the ratio of polyol to water in Coating Compositions C and F. In general, no difficulties were encountered during the preparation of casings D-2 and E though there was some evidence of casing seizure being experienced. The amount of water applied in the preparation of casings D-2 and E was controlled only by reducing the delivery level of the applicable coating compositions.

Casings C, D-2, E and F all exhibit improved peelability characteristics when stuffed, processed and peeled according to the procedures detailed in Examples I and II.

EXAMPLE X

Two tubular casings were internally treated with an aqueous coating composition containing CMC-7LF using the "slug" method of application of the coating, and the coated casings were then dried in the inflated state. One casing was treated to provide a coating of 0.014 mg/in$^2$ of CMC on the internal casing surface, and the other casing was treated to provide a coating of 0.002 mg/in$^2$ of CMC on the casing surface. A control casing having no internal surface coating and the two coated casing samples were subsequently shirred and stuffed with a frankfurter meat emulsion and processed according to standard commercial smokehouse procedures. The processed encased food products were sprayed with water and then peeled by passing through a commercial "Ranger Peeler" machine. Peelability of the control casing was about 80% while both coated casings exhibited 100% peelability.

EXAMPLE XI

This example illustrates the use of non-aqueous coating compositions for treating tubular casing. Application of the coating composition through a hollow shirring mandrel about which the casing is shirred has been shown to be a particularly advantageous method of preparing the casings of the invention. The use of pumping equipment and spray nozzles are required to apply the desired coating in conjunction with the shirring apparatus. The affect of the coating composition on such equipment as well as the results of the treating process are of significance.

Coating compositions were prepared having the proportion of ingredients described in Table 12, below.

TABLE 12

| INGREDIENTS | COATING COMPOSITION (%) | | | |
|---|---|---|---|---|
| | A | B | C | D |
| "CMC 7LF" | — | 2.0 | 2.0 | 2.0 |
| Methylcellulose | 2.0 | — | — | — |
| Castor Oil | 98.0 | 98.0 | — | — |
| Mineral Oil | — | — | 98.0 | — |
| Water | — | — | — | 40.0 |
| "Tween 80" | — | — | — | 2.5 |
| Propylene Glycol | — | — | — | 55.5 |

The methylcellulose used in composition A was Methocel MC-10 purchased from Dow Chemical Company.

Using the type of cellulosic casing, shirring apparatus and coating procedures described in Example I, the following shirred casing samples were prepared with the coating compositions of this Example:

Shirred Casing A: 1.75 mg/in$^2$ of Coating Composition A was used to treat the surface of the casing whereby it was attempted to apply 0.035 mg/in$^2$ of methylcellulose and 1.715 mg/in$^2$ of castor oil to the internal surface thereof.

Shirred Casing B: 1.75 mg/in$^2$ of Coating Composition B was used to treat the surface of the casing whereby it was attempted to apply 0.035 mg/in$^2$ of CMC and 1.715 mg/in$^2$ of castor oil.

Shirred Casing C: 1.75 mg/in$^2$ of Coating Composition C was used to treat the surface of the casing whereby it was attempted to apply 0.035 mg/in$^2$ of CMC and 1.715 mg/in$^2$ of mineral oil.

Shirred Casing D: 1.75 mg/in$^2$ of Coating Composition D was used to treat the internal surface of the casing whereby an admixture of 0.035 mg/in$^2$ of CMC and 0.044 mg/in$^2$ of Tween 80 was applied thereto.

Shirred Casing E: control casing using conventional shirring methods whereby mineral oil is applied to the casing with inflation air for lubrication purposes. Coating Compositions A, B and C were very difficult to apply, rapid settling out of the cellulose ether component making application of desired uniform amounts thereof very difficult, if not impossible. Further, the nozzle and pump of the shirring apparatus plugged during application of the compositions. No coating or shirring problems were experienced in preparing casing samples D and E.

A frankfurter meat emulsion prepared from a high collagen content formulation was stuffed into the shirred lengths of casing samples and linked into frankfurters using conventional automatic stuffing and linking apparatus. There were no difficulties encountered during stuffing and linking of any of the casings. The stuffed casings were all processed in a smokehouse using a processing cycle known to adversely affect the peelability of casing from encased meat products.

Peelability characteristics of the various casing samples were evaluated on an automatic peeling machine Using the type of cellulosic casing, shirring apparatus and coating procedures described in Example I, the shirred casing samples described in Table 15 below were prepared:

TABLE 15

| Shirred Casing Sample | A | B | C | D | E | F | G | H |
|---|---|---|---|---|---|---|---|---|
| Coating Composition | A | B | C | D | E | F | G | H |
| Amount of Ingredients Applied to Casing mg/in$^2$ | | | | | | | | |
| "CMC 7LF" | 0.035 | 0.035 | 0.035 | 0.035 | 0.005 | 0.01 | 0.02 | 0.035 |
| "Tween 80" | 0.7 | 0.53 | 0.35 | 0.175 | 0.050 | 0.10 | 0.2 | 0.044 |
| Ratio of Ingredients "Tween 80" to CMC | 20:1 | 15:1 | 10:1 | 5:1 | 10:1 | 10:1 | 10:1 | 1.26:1 | known commercially as a "Ranger Apollo Peeler" that was adjusted to operate at a rate of 3500 pounds of frankfurters per hour.

The encased frankfurters were sprayed thoroughly with water prior to being passed through the peeling apparatus. Results of peeling tests wherein peelability is reported as weight per cent of food product peeled (i.e., 0% denotes that no casing had been removed and 100% represents total peeling and release of the casing from the encased food product) are set forth in Table 13, below.

TABLE 13

| Casing | Peelability (%) |
|---|---|
| A | 0 |
| B | 0 |
| C | 0 |
| D | 100 |
| E | 0 |

As can be seen from the above results, application of non-aqueous Coating Compositions A, B and C to the interior surface of the casings while they were being shirred did not improve the peelability characteristics thereof. No coating or other processing difficulties were experienced in preparing casing D which casing exhibited excellent peeling characteristics. The application of mineral oil to the surface of the casing during the preparation of casing E did not result in any improvement in peelability characteristics.

EXAMPLE XII

Various means for stabilizing the non-aqueous mixture of cellulose ether in castor oil and mineral oil were evaluated without a great deal of success. Some improvement in stabilizing the suspension was realized by employing glycerine as a thickening agent, but the coating composition could not be applied by spraying through the shirring mandrel due to a substantial increase in the viscosity and the particulate nature of the cellulose ether.

EXAMPLE XIII

Using the carboxymethylcellulose of Example XI, coating compositions having the proportion of ingredients listed in Table 14 below were prepared:

No coating or shirring problems were experienced in preparing the shirred casing samples but it was found that the coherency of several of the shirred sticks was weak and casing stick A was not self-sustaining. The coherency of each of the shirred casing sticks was measured using the method described above and the results are recorded in Table 16, below:

TABLE 16

| | COHERENCY (in inch-lbs.) |
|---|---|
| Shirred Casing A | too weak to measure |
| B | 1.4 |
| C | 1.2 |
| D | 2.6 |
| E | 2.8 |
| F | 3.1 |
| G | 2.8 |
| H | 4.0 |

All the casing samples were stuffed, processed and peeled using the procedure of Example XI. All casing samples were found to exhibit excellent peelability characteristics, however casing A requires special handling due to its lack of coherency and would not be suitable for use with automatic stuffing apparatus, and casing B and C could only be considered marginally suitable for use with such stuffing apparatus.

EXAMPLE XIV

This example illustrates the use of non-aqueous coating compositions for treating tubular casings using the slugging method of application of the coating composition.

Coating compositions were prepared using the proportion of ingredients described in Table 17, below:

TABLE 17

| INGREDIENTS | COATING COMPOSITION | | |
| | A | B | C |
|---|---|---|---|
| "CMC 7LF" | — | 2% | 2% |
| Methylcellulose | 2% | — | — |
| Castor Oil | 98% | 98% | — |
| Mineral Oil | — | — | 98% |
| Viscosity | 724 cps | 724 cps | 34 cps |

TABLE 14

| INGREDIENTS | COATING COMPOSITION (%) | | | | | | | |
| | A | B | C | D | E | F | G | H |
|---|---|---|---|---|---|---|---|---|
| "CMC 7LF" | 1.0 | 1.0 | 1.0 | 1.0 | .143 | .286 | .572 | 1.0 |
| "Tween 80" | 20.0 | 15.0 | 10.0 | 5.0 | 1.43 | 2.86 | 5.72 | 1.25 |
| Water | 40.0 | 40.0 | 40.0 | 40.0 | 40.0 | 40.0 | 40.0 | 40.0 |
| Propylene Glycol | 39.0 | 44.0 | 49.0 | 54.0 | 58.427 | 56.854 | 53.708 | 57.75 |

TABLE 20

| Casing Sample | J | K | L | M | N | O | P | Q | R | Control |
|---|---|---|---|---|---|---|---|---|---|---|
| Coating Composition | J | K | L | M | N | O | P | Q | R | |
| Amount of Coating (mg/in$^2$) | | | | | | | | | | |
| "CMC 7LF" | .035 | .035 | .035 | .035 | .035 | .035 | .035 | .035 | .035 | — |
| Mineral Oil | 0.7 | 0.7 | 0.53 | 0.53 | 0.53 | 0.35 | 0.35 | 0.35 | — | — |
| "Tween 80" | .035 | — | — | .035 | — | — | .028 | — | .044 | — |
| "Surfactol 365" | — | .035 | — | — | .035 | — | — | .028 | — | — |
| Peelability (%) | 100 | 100 | 100 | 100 | 100 | 100 | 100 | 100 | 100 | 0 |
| Coherency (in.-lbs.) | 0.6 | 0.7 | 3.0 | 0.7 | 0.8 | 2.9 | 1.8 | 1.1 | 3.4 | 3.5 |

The results show that while peelability of the casing is substantially improved by application of each of the coating compositions of the example, the amount of oil component applied to the surface of the casing and type of emulsifier employed in preparing the coating composition have a definite affect on the coherency of the shirred casing sticks and thereby the suitability thereof for use with automatic stuffing equipment. It was found, for example, that Casing Samples B, J, K, M and N were readily broken and the casing sticks would be generally unsuitable for commercial use.

Although the present invention has been described and set forth in some detail, it should be further understood that the same is susceptible of changes, modifications and variations without departing from the scope and spirit of the invention.

What is claimed is:

1. A tubular cellulosic casing having a coating over the internal surface thereof, said coating comprising a homogeneous admixture of at least two components, one of said components being a water-soluble cellulose ether and a second component being a member selected from the group consisting of animal and vegetable oils, mineral oil, silicone oils and water soluble alkylene oxide adducts of fatty acid partial esters, said cellulose ether component of said coating being present in an amount of at least about 0.001 mg/in$^2$ of internal casing surface and said second component being present in said coating in an amount of at least 0.1 times the weight of said first component and not more than about 0.5 mg/in$^2$ of casing surface, said casing being suitable for stuffing with food products and being readily peelable from food products processed therein.

2. The casing of claim 1 wherein said cellulose ether component of said coating is selected from the group consisting of methylcellulose, hydroxyethylcellulose, carboxymethylcellulose, carboxymethyl hydroxyethylcellulose, hydroxypropyl cellulose and hydroxypropyl methylcellulose.

3. The casing of claim 2 wherein said water-soluble cellulose ether component is carboxymethylcellulose.

4. The casing of claim 2 wherein said water-soluble cellulose ether component is methylcellulose.

5. The casing of claim 2 wherein said water-soluble cellulose ether component is carboxymethyl hydroxyethylcellulose.

6. The casing of claim 1 wherein said second component is present in said coating in an amount which is not more than about 15 times the weight of said cellulose ether component, but whereby said second component is present on the internal surface of said casing in an amount which is not more than about 0.5 mg/in$^2$ of casing surface.

7. The casing of claim 1 wherein said cellulose ether component of said coating is present in an amount of between about 0.002 mg/in$^2$ and .07 mg/in$^2$ of casing surface.

8. The casing of claim 1 wherein said second component is present in said coating in the ratio by weight of said second component to said cellulose ether component of between about 0.5 to 1 and 5.0 to 1.

9. The casing of claim 1 wherein said second component of said coating is a water-soluble ethylene oxide adduct of fatty acid partial esters.

10. The casing of claim 9 wherein said second component is present in an amount of not more than about 0.05 mg/in$^2$ of casing surface.

11. A method of preparing tubular cellulosic food casings that are readily peelable from food products encased therein which includes the step of applying not more than about 5 mg/in$^2$ of a homogeneous aqueous coating composition and less than 3 mg/in$^2$ of water while applying at least about 0.001 mg/in$^2$ of cellulose ether to the internal surface of a tubular cellulosic food casing, said aqueous coating composition containing at least about 0.05% by weight of a water-soluble cellulose ether and between about 0.1 and 15 times the amount of said cellulose ether of a second component selected from the group consisting of animal and vegetable oils, mineral oil, silicone oils and a water-soluble alkylene oxide adduct of fatty acid partial esters.

12. The method of claim 11 wherein between about 0.002 mg/in$^2$ and 0.07 mg/in$^2$ of said cellulose ether is applied to the internal surface of said casing.

13. The method of claim 11 wherein the aqueous coating composition contains between about 10% and 90% by weight of a polyol having from 3–6 carbon atoms and at least 2 hydroxyl groups, said polyol being present in the weight ratio of polyol to water of at least 0.15 to 1.

14. The method of claim 13 wherein the weight ratio of polyol to water in said coating composition is in the range of between about 0.4 to 1 and 2.5 to 1.

15. The method of claim 11 wherein said water-soluble cellulose ether is selected from the group consisting of methylcellulose, hydroxyethylcellulose, carboxymethylcellulose, carboxymethyl hydroxyethylcellulose, hydroxypropylcellulose and hydroxypropyl methylcellulose.

16. An improved method of preparing a processed food product, the improvement which includes the step of stuffing a food emulsion into a tubular cellulosic casing having a coating over the internal surface thereof comprising a homogeneous admixture of between about 0.002 mg/in$^2$ and 0.07 mg/in$^2$ of a water-soluble The methylcellulose and carboxymethylcellulose used in Example XI was used in preparing the compositions of this example.

Three tubular casings, A, B and C, were internally treated with Coating Compositions A, B and C, respectively, using slugging methods well known in the art in an attempt to provide a coating of 0.035 mg/in$^2$ of cellulose ether component on the internal surface of the casing. The cellulose ether components of the mixtures were insoluble in the oil and they settled out rapidly. Further, the very viscous castor oil mixtures made use thereof more difficult than would be commercially acceptable.

The three coated casing samples were shirred using the shirring apparatus of Example I. It was found that the casing samples A and B were difficult to shirr, and shirred casing sticks produced therefrom exhibited a great deal of growth in length. Further, shirred casing sticks prepared from Casing Samples A and B exhibited no coherency and were very "oily".

The shirred casing samples were subsequently stuffed and processed as described in Example XI. The total lack of coherency found for Casing Samples A and B made stuffing thereof very difficult and these casings could not be suitably employed with automatic stuffing equipment.

Peelability characteristics of the casing samples were evaluated as described in Example XI and the results of the evaluation are set forth in Table 18, below:

TABLE 18

| Casing | Peelability (%) |
|---|---|
| A | 100 |
| B | 100 |
| C | 0 |

As can be seen from the results of this example, the use of non-aqueous coating compositions for treating the interior surface of tubular casings by slugging techniques to improve the peelability characteristics thereof involved many processing difficulties. Further, while Casing Samples A and B exhibited improved peelability characteristics, the shirred casing samples were unsuitable because of a lack of coherency and shirred Casing Sample C exhibited no improvement in peelability.

EXAMPLE XV

This example illustrates the suitability of various proportions of mineral and vegetable oils used in conjunction with the cellulose ether component in preparation of shirred tubular casing having improved peelability characteristics.

Summarized in Table 18 below are the proportions of the various ingredients that were used to prepare the coating compositions of this example. "Surfactol 365" is the trade mark for a mixture of water dispersible fatty acid ester surface active agents purchased from the Baker Castor Oil Co.

To obtain Coating Compositions B, C, E, F, H, I, J, K, M, N, P and Q, an aqueous emulsion of castor oil or mineral oil was prepared using the emulsifier noted and the emulsion was then admixed with an aqueous CMC solution.

Using the method and casing described in Example I shirred casing samples were prepared by applying 3.5 mg/in$^2$ of the various coating compositions of this example to the internal surface of the casing. Coating Compositions A, D, G, L and O were found to separate very rapidly and the uniform application of aqueous coating compositions prepared without using an appropriate emulsifier agent for the oil and water components would not be possible on a commerical basis. The peelability characteristics of each of the casing samples of this example were evaluated using the meat emulsion, processing conditions and peeling test of Example XI. The coherency of each of the shirred casing samples of the example was evaluated using the procedures described above. The peelability and coherency test results for the various casings of this example along with proportions of the various ingredients applied to the surface of the casing are summarized in Tables 19 and 20, below.

TABLE 18

| INGREDIENTS | A | B | C | D | E | F | G | H | I | J | K | L | M | N | O | P | Q | R |
|---|---|---|---|---|---|---|---|---|---|---|---|---|---|---|---|---|---|---|
| "CMC 7LF" | 1 | 1 | 1 | 1 | 1 | 1 | 1 | 1 | 1 | 1 | 1 | 1 | 1 | 1 | 1 | 1 | 1 | 1 |
| Water | 40 | 40 | 40 | 40 | 40 | 40 | 40 | 40 | 40 | 40 | 40 | 40 | 40 | 40 | 40 | 40 | 40 | 40 |
| Propylene Glycol | 39 | 38 | 38 | 44 | 43 | 43 | 49 | 48 | 48 | 38 | 38 | 44 | 43 | 43 | 49 | 48.2 | 48.2 | 57.75 |
| Castor Oil | 20 | — | — | 15 | — | — | 10 | — | — | — | — | — | — | — | — | — | — | — |
| Castor Oil + Emulsifier | — | 20 | 20 | — | 15 | 15 | — | 10 | 10 | — | — | — | — | — | — | — | — | — |
| "Tween 80" | — | 1 | — | — | 1 | — | — | 1 | — | — | — | — | — | — | — | — | — | — |
| "Surfactol 365" | — | — | 1 | — | — | 1 | — | — | 1 | — | — | — | — | — | — | — | — | — |
| Mineral Oil | — | — | — | — | — | — | — | — | — | — | — | 15 | — | — | 10 | — | — | — |
| Mineral Oil + Emulsifier | — | — | — | — | — | — | — | — | — | 20 | 20 | — | 15 | 15 | — | 10 | 10 | — |
| "Tween 80" | — | — | — | — | — | — | — | — | — | 1 | — | — | 1 | — | — | .8 | — | — |
| "Surfactol 365" | — | — | — | — | — | — | — | — | — | — | 1 | — | — | 1 | — | — | .8 | — |
| "Tween 80" | | | | | | | | | | | | | | | | | | 1.25 |

TABLE 19

| Casing Sample | A | B | C | D | E | F | G | H | I | R | Control |
|---|---|---|---|---|---|---|---|---|---|---|---|
| Coating Composition | A | B | C | D | E | F | G | H | I | R | |
| Amount of Coating (mg/in$^2$) | | | | | | | | | | | |
| "CMC 7LF" | .035 | 0.035 | .035 | .035 | .035 | .035 | .035 | .035 | .035 | .035 | — |
| Castor Oil | 0.7 | 0.7 | 0.7 | 0.53 | 0.53 | 0.53 | 0.35 | 0.35 | 0.35 | — | — |
| "Tween 80" | — | 0.035 | — | — | .035 | — | — | .028 | — | .044 | — |
| "Surfactol 365" | — | — | .035 | — | — | .035 | — | — | .028 | — | — |
| Peelability (%) | 100 | 100 | 100 | 100 | 100 | 100 | 100 | 100 | 100 | 100 | 0 |
| Coherency (in.-lbs.) | 3.0 | 0.5–1.5 | 1.7 | 3.1 | 1.5 | 2.0 | 3.0 | 2.1 | 2.8 | 3.4 | 3.5 | cellulose ether and a second component selected from the group consisting of animal and vegetable oils, mineral oil, silicone oil, and water soluble alkylene oxide adducts of fatty acid partial esters, said second component being present in an amount of at least 0.1 times the weight of said cellulose ether and not more than about 0.5 mg/in$^2$.

* * * * *

UNITED STATES PATENT OFFICE
CERTIFICATE OF CORRECTION

Patent No. 3,898,348  Dated August 5, 1975

Inventor(s) H. S. Chiu et al.

It is certified that error appears in the above-identified patent and that said Letters Patent are hereby corrected as shown below:

Column 1, line 38; "results" should read --result--
Column 3, line 31; "my" should read --may--
Column 6, line 28; "provided" should read --providing--
Column 7, line 46; "as" should read --was--
Column 12, line 49; "CMC 9M8+" should read --"CMC 9M8"--
Column 15, line 49; place quotation marks (") about --"Tween 80"--
Column 16, lines 57,64; place quotation marks (") about --"Tween 80"--
Column 17, lines 2,23; place quotation marks (") about --"Tween 80"--
Column 17, lines 7,12,17,22,23; place quotation marks (") about --"Methocel MC-100"--
Column 17, line 49; place quotation marks (") about --"CMC-7LF"--
Column 18, line 26; place quotation marks (") about --"Methocel MC-10"--
Column 18, line 48; place quotation marks (") about --"Tween 80"--
Table 19, bridging Cols. 21 and 22 should read as shown in attached Table 19
Table 20, bridging Cols. 23 and 24 should read as shown in attached Table 20

Signed and Sealed this

Twentieth Day of July 1976

[SEAL]

Attest:

RUTH C. MASON
Attesting Officer

C. MARSHALL DANN
Commissioner of Patents and Trademarks